United States Patent
Yu et al.

(10) Patent No.: US 8,971,228 B2
(45) Date of Patent: Mar. 3, 2015

(54) METHOD FOR CONFIGURING PARAMETERS, BASE STATION AND USER EQUIPMENT

(71) Applicant: Huawei Technologies Co., Ltd, Shenzhen (CN)

(72) Inventors: Chengwen Yu, Shanghai (CN); Jihai Han, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 79 days.

(21) Appl. No.: 13/950,095

(22) Filed: Jul. 24, 2013

(65) Prior Publication Data

US 2014/0003316 A1    Jan. 2, 2014

Related U.S. Application Data (63) Continuation of application No. 13/723,924, filed on Dec. 21, 2012, now Pat. No. 8,582,483, which is a continuation of application No. PCT/CN2012/077648, filed on Jun. 27, 2012.

(51) Int. Cl.
*G08C 17/00* (2006.01)
*H04W 76/04* (2009.01)
*H04W 52/02* (2009.01)

(52) U.S. Cl.
CPC ........ *H04W 76/048* (2013.01); *H04W 52/0216* (2013.01); *Y02B 60/50* (2013.01)
USPC ........................................................ 370/311

(58) Field of Classification Search
None
See application file for complete search history.

(56) References Cited

U.S. PATENT DOCUMENTS

| 8,310,919 B2 * | 11/2012 | Worrall .......................... 370/229 |
| 2008/0248840 A1 * | 10/2008 | Kim et al. ..................... 455/574 |
| 2010/0061290 A1 * | 3/2010 | Lee et al. ....................... 370/312 |
| 2011/0239273 A1 | 9/2011 | Yang et al. |
| 2012/0120815 A1 | 5/2012 | Anderson et al. |

FOREIGN PATENT DOCUMENTS

| CN | 101534544 | 9/2009 |
| CN | 101873530 | 10/2010 |
| CN | 101931870 | 12/2010 |
| EP | 2 079 269 | 7/2009 |
| EP | 2157830 A1 | 2/2010 |
| WO | 2011123744 A1 | 10/2011 |

OTHER PUBLICATIONS

International Search Report and Written Opinion of PCT Application No. PCT/CN2012/077648, mailed Apr. 4, 2013, 17 pages. (Partial Translation).

* cited by examiner

*Primary Examiner* — Raj Jain
(74) *Attorney, Agent, or Firm* — Slater & Matsil, L.L.P.

(57) ABSTRACT

The present invention applies to the field of communications, and provides a method for configuring parameters, a base station and a user equipment. In a method, a user equipment (UE) obtains discontinuous reception (DRX) parameters from a base station. The DRX parameters are obtained when a service type of the UE is a sparse packet service. The UE performs DRX control according to the DRX parameters.

12 Claims, 7 Drawing Sheets

METHOD FOR CONFIGURING PARAMETERS, BASE STATION AND USER EQUIPMENT

This application is a continuation of U.S. patent application Ser. No. 13/723,924, filed on Dec. 21, 2012, which is a continuation of International Application No. PCT/CN2012/077648, filed on Jun. 27, 2012. The afore-mentioned patent applications are hereby incorporated by reference in their entireties.

TECHNICAL FIELD

The present invention relates to the field of communications, and in particular, to a method for configuring parameters, a base station and a user equipment (UE).

BACKGROUND

The 3rd Generation Partnership Project (3GPP) defines the discontinuous reception (DRX) technology starting from the Long Term Evolution (LTE) Release 8 (Rel 8), so that a UE can turn off a transceiver in a period of time, thereby achieving the purpose of power saving for a terminal.

The existing DRX mechanism is directed to an application scenario in which the time of sending and receiving data is irregular or the size of a data packet is irregular, and a DRX period thereof cannot be set too long; otherwise, such a case may occur that a sounding reference signal (SRS) cannot be transmitted in time when the UE is in a sleep stage, thereby causing uplink out-of-synchronization of the UE.

However, in a certain application scenario, if the existing DRX mechanism is maintained, the UE is in a waking state in the DRX for a long time and the activation time is too long, which increases energy consumption of the terminal.

SUMMARY OF THE INVENTION

In one aspect, the present invention provides a method for configuring parameters, which aims at solving the problem of the increase of terminal energy consumption of a UE caused by an existing method for configuring parameters.

An embodiment of the present invention is implemented as follows. A method for configuring parameters includes determining by a base station whether a service type of a user equipment UE is a sparse packet service. The base station determines discontinuous reception DRX parameters of the sparse packet service when the service type of the UE is the sparse packet service. The base station sends the DRX parameters to the UE. The DRX parameters are used by the UE to perform DRX control.

In another aspect, embodiments of the present invention provide a method for configuring parameters. When a service type of a user equipment UE is a sparse packet service, the UE obtains discontinuous reception DRX parameters from a base station and performs DRX parameter configuration according to the DRX parameters.

Another aspect of embodiments of the present invention is to provide a base station. A first judgment unit is configured to determine whether a service type of a user equipment UE is a sparse packet service. A first determination unit is configured to determine discontinuous reception DRX parameters of the sparse packet service when a determination result of the first judgment unit is that the service type of the UE is the sparse packet service. A sending unit is configured to send the DRX parameters determined by the first determination unit to the UE. The DRX parameters are used by the UE to perform DRX control.

Another aspect of the embodiments of the present invention is to provide a user equipment UE. A second obtaining unit is configured to obtain discontinuous reception DRX parameters from a base station when a service type of the UE is a sparse packet service. A control unit is configured to perform DRX control according to the DRX parameters obtained by the second obtaining unit.

In embodiments of the present invention, when determining that the service type of the UE is the sparse packet service, the base station configures corresponding DRX parameters for the UE, thereby reducing energy consumption of the UE.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

To make the objectives, technical solutions, and advantages of the present invention more comprehensible, the following describes the present invention in detail with reference to the accompanying drawings and embodiments. It is understandable that the specific embodiments described herein are only used to explain the present invention and are not intended to limit the present invention.

In the embodiments of the present invention, when determining that a service type of a UE is a sparse packet service, a base station configures corresponding DRX parameters for the UE, thereby reducing energy consumption of the UE. For example, a longer DRX period may be adopted, so as to decrease the activation time of the UE in a DRX state in the process that the UE uses the sparse packet service, thereby reducing terminal energy consumption of the UE.

In the embodiments of the present invention, sparse packet services may include regular or irregular sparse packet services. The regular sparse packet services may include heartbeat services (for example, instant messaging services such as QQ, MSN and espace) and machine-to-machine/man (M2M) periodic services. The irregular sparse packet services refer to sparse packet services other than the regular sparse packets. For this type of services, the sending and receiving of data has a certain periodicity, a small amount of data is sent and received each time, and the requirement for a time delay is not high when the UE performs data transmission.

Figure 1:
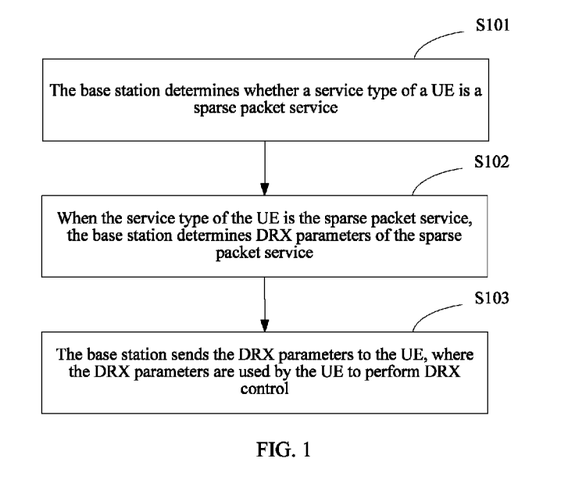
FIG. 1 is a flow chart illustrating implementation of a method for configuring parameters provided by an embodiment of the present invention at a base station side.

FIG. 1 shows an implementation flow of a method for configuring parameters provided by an embodiment of the present invention. In this embodiment, an execution subject of the flow is a base station, and detailed description is as follows.

In step S101, the base station determines whether a service type of a UE is a sparse packet service.

As an embodiment of the present invention, the base station may determine whether a service type is a sparse packet service by obtaining the service type reported by the UE. In this embodiment, the UE may obtain, from an application layer, the service type currently used by the UE, and report the service type to the base station.

As another embodiment of the present invention, the base station may determine whether the service type of the UE is the sparse packet service by obtaining the packet arrival interval distribution of data packets from the UE. In this embodiment, a packet arrival interval is an arrival time interval of two adjacent data packets sent to the base station by the UE. For different service types, the sending of data packets by the UE may have different periodicities. For example, for a sparse packet service, the sending interval of adjacent data packets may vary from tens of seconds to a few minutes or even tens of minutes, while for other service types than the sparse packet service, for example, a real-time sending and receiving service, the sending interval of adjacent data packets may be a few seconds or even shorter. Therefore, the base station may determine the service type of the UE by obtaining the packet arrival interval distribution of the data packets from the UE.

Figure 2:
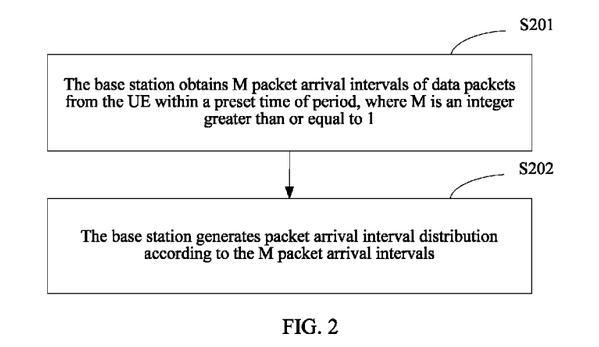
FIG. 2 is a flow chart illustrating specific implementation of step S101 of a method for configuring parameters provided by an embodiment of the present invention.

As an embodiment of the present invention, as shown in FIG. 2, the base station may obtain the packet arrival interval distribution of the data packets from the UE through statistical analysis, which is specifically as follows.

In step S201, the base station obtains M packet arrival intervals of data packets from the UE within a preset time of period, where M is an integer greater than or equal to 1.

In this embodiment, the base station obtains M packet arrival intervals of data packets from the UE within a preset time of period by obtaining the data packets from the UE within the preset time of period.

In step S202, the base station generates packet arrival interval distribution according to the M packet arrival intervals.

Figure 3:
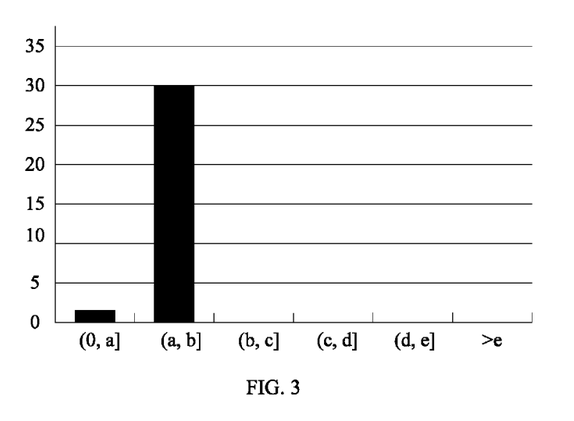
FIG. 3 is a diagram of packet arrival interval distribution provided by an embodiment of the present invention.

For example, after obtaining the M packet arrival intervals of the data packets from the UE, the base station can obtain a distribution diagram shown in FIG. 3. It can be seen from the distribution diagram that, most of the packet arrival intervals of the data packets from the UE are in the interval {a, b], while a few packet arrival intervals are in the interval {0, a]. The base station can determine a service type corresponding to the packet arrival interval distribution according to the main interval of the packet arrival interval distribution.

As another embodiment of the present invention, by receiving the reporting message of the UE, the base station may also obtain the packet arrival interval distribution carried in the reporting message. In this embodiment, the UE obtains the current service type thereof from the application layer, and obtains the packet arrival interval distribution of the service type in a preset list, where the preset list is prestored at the UE side, and service types that the UE may use and packet arrival interval distribution corresponding to the service types are preset in the preset list.

In this embodiment, the manner for the UE to send the reporting message to the base station may be periodic interval reporting, reporting upon event triggering or periodic interval reporting upon event triggering, which is not limited herein.

In step S102, when the service type of the UE is a sparse packet service, the base station determines DRX parameters of the sparse packet service.

In step S103, the base station sends the DRX parameters to the UE, where the DRX parameters are used by the UE to perform DRX control.

In this embodiment, when determining that the service type of the UE is the sparse packet service, the base station obtains a set of DRX parameters corresponding to the sparse packet service, and sends the set of DRX parameters to the UE, so that the UE performs DRX parameter configuration according to the set of DRX parameters. Compared with the DRX parameters in the prior art, the DRX parameters corresponding to the sparse packet service can be used to decrease the activation time of the UE in a DRX state, for example, a longer DRX period may be adopted in the set of DRX parameters. For example, under the constraint of an existing protocol, a long DRX period with a length of 2560 ms satisfying the maximum specification of the protocol may be configured, so as to minimize the activation time of the UE in the DRX state according to the service feature, that is, the long packet arrival interval time, of the data packets of the sparse packet service, thereby saving terminal energy consumption of the UE. The length of the long DRX period is merely an example. Besides, with the evolution of the protocol, the length satisfying the maximum specification of the protocol may also change.

Furthermore, when the base station determines the service type of the UE through the packet arrival interval distribution, the base station may preset N sets of preset DRX parameters, where N is an integer greater than or equal to 1, and each packet arrival interval distribution may correspond to one set of preset DRX parameters. After obtaining the packet arrival interval distribution, by matching the packet arrival interval distribution in the N sets of preset DRX parameters, the base station can determine a set of DRX parameters best matching the current service type of the UE, thereby further improving the accuracy of matching between the DRX parameters and the current service type of the UE, and making configured DRX parameters more compliant with the service feature of the specific service type.

For example, packet arrival interval distribution intervals shown in FIG. 3 may be obtained through division at a base station side, and one set of preset DRX parameters is matched for the packet arrival interval distribution in each packet arrival interval distribution interval. The base station can determine corresponding DRX parameters only by correspondingly obtaining the packet arrival interval distribution interval where the packet arrival interval distribution is in. Of course, the packet arrival interval distribution in two or more packet arrival interval distribution intervals may correspond to one set of preset DRX parameters.

Figure 4:
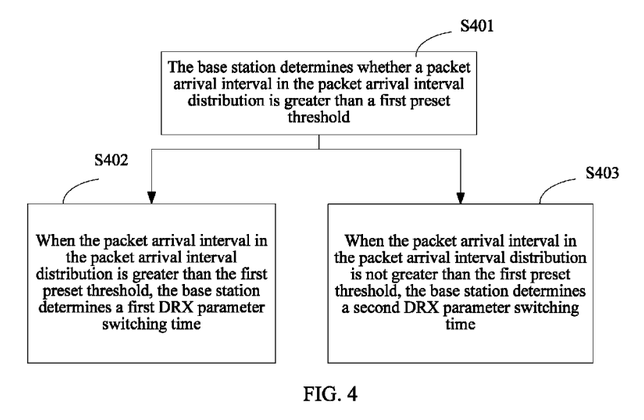
FIG. 4 is a flow chart illustrating specific implementation of step S103 of a method for configuring parameters provided by an embodiment of the present invention.

As an embodiment of the present invention, the base station may determine a DRX parameter switching time according to the packet arrival interval distribution of the service type of the UE, so as to control the base station to switch the DRX parameters of the UE, where the UE uses the DRX parameters to perform DRX control. FIG. 4 shows a specific flow chart of step S103 of the method for configuring parameters provided by the embodiment of the present invention, which is described in detail as follows.

In step S401, the base station determines whether a packet arrival interval in the packet arrival interval distribution is greater than a first preset threshold.

In this embodiment, the first preset threshold may be used to distinguish a sparse packet service and a non-sparse packet service. The packet arrival interval greater than the first preset threshold may be tens of seconds, a few minutes or tens of minutes, and the packet arrival interval less than the first preset threshold may be a few seconds.

In step S402, when the packet arrival interval in the packet arrival interval distribution is greater than the first preset threshold, the base station determines a first DRX parameter switching time.

In step S403, when the packet arrival interval in the packet arrival interval distribution is not greater than the first preset threshold, the base station determines a second DRX parameter switching time.

In this embodiment, the first DRX parameter switching time is not equal to the second DRX parameter switching time, and the first DRX parameter switching time and the second DRX parameter switching time are used to control the base station to switch DRX parameters.

In this embodiment, a first preset threshold is preset at the base station side, and the packet arrival interval distribution, of the service type of the UE, obtained by the base station is compared with the first preset threshold, so as to control the base station to switch the DRX parameters of the UE at a reasonable time point.

Taking the principle of determining the first preset threshold in step S401 as an example, when the packet arrival interval in the obtained packet arrival interval distribution is greater than the first preset threshold, it indicates that the sending period of the data packets from the UE is long, so the service type corresponding to the packet arrival interval distribution is a sparse packet service. At this time, the DRX parameters of the UE are switched after the first DRX parameter switching time with a short duration, so that the UE can perform DRX parameter configuration as soon as possible to adjust the DRX parameters to a state suitable for the service type of the sparse packet service, and the UE is prevented from being in an active state for a long time. On the contrary, when the packet arrival interval in the obtained packet arrival interval distribution is not greater than the first preset threshold, it indicates that the sending period of the data packets from the UE is long. At this time, the UE is using a non-sparse packet service, so the DRX parameters of the UE are switched after the second DRX parameter switching time with a long duration, so that the DRX parameter configuration operation of the UE is delayed, and the UE is prevented from out-of-synchronization in a real-time data sending and receiving process so as not to affect data transmission effect. In this embodiment, the base station no longer maintains uplink synchronization after the determined DRX parameter switching time arrives.

It should be noted that, the data sending and receiving process of the sparse packet service involves heartbeat packets and a small number of service data packets, the packet arrival interval of the heartbeat packets is relatively long, and the small number of service data packets may be sent at a short packet arrival interval. At the same time, the statistics of the packet arrival intervals may also have certain errors due to irresistible reasons such as communication link faults. Therefore, "greater than" and "not greater than" mentioned in comparison between the packet arrival interval distribution and the relevant preset threshold in all the embodiments of the present invention are both significant "greater than" and significant "not greater than", so as to ignore some small probability statistical results caused by statistical errors. This principle is used as a basis for illustration of the subsequent embodiments, and is not described later again.

Besides, in the embodiment of the present invention, after obtaining the packet arrival interval distribution, the base station may filter out packet arrival interval data whose packet arrival interval is less than a certain threshold to obtain the packet arrival interval distribution after filtering, and determine the corresponding parameters according to the packet arrival interval distribution after filtering, so as to accelerate the determination process of the DRX parameters and improve the accuracy of the DRX parameters.

Figure 5:
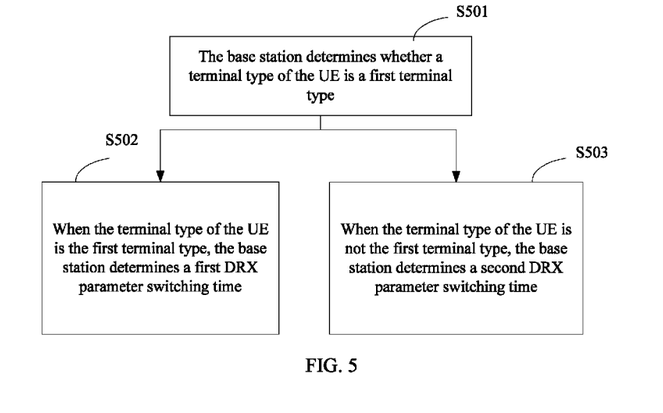
FIG. 5 is a flow chart illustrating specific implementation of step S103 of a method for configuring parameters provided by another embodiment of the present invention.

As another embodiment of the present invention, the base station may determine, according to a terminal type of the UE, the time for switching the DRX parameters of the UE. FIG. 5 shows a specific flow chart of step S103 of the method for configuring parameters provided by another embodiment of the present invention, which is described in detail as follows.

In step S501, the base station determines whether a terminal type of the UE is a first terminal type.

The terminal type includes, but is not limited to, a smart terminal and an un-smart terminal. The smart terminal is mostly used to run a non-real-time application. As an example, when the terminal type is the smart terminal, the base station may consider the service type of the UE as a sparse packet service by default. In this embodiment, the base station may receive a reporting message of the UE, and extract, from the reporting message, content or a special field used to indicate the terminal type of the UE, thereby obtaining the terminal type of the UE; and the base station may also determine the terminal type of the UE according to a default terminal type at the base station side, for example, the base station considers the terminal type of the UE as a smart terminal by default.

In step S502, when the terminal type of the UE is the first terminal type, the base station determines a first DRX parameter switching time.

In step S503, when the terminal type of the UE is not the first terminal type, the base station determines a second DRX parameter switching time.

The first DRX parameter switching time is not equal to the second DRX parameter switching time, and the first DRX parameter switching time and the second DRX parameter switching time are used to control the base station to switch the DRX parameters.

In this embodiment, the principle of determining the DRX parameter switching time through the terminal type of the UE is consistent with the principle of the embodiment in FIG. 4 of the present invention. That is, when the terminal type of the UE is a first terminal type (a smart terminal), it is determined that the UE uses a sparse packet service. At this time, the DRX parameters of the UE are switched after the first DRX parameter switching time with a short duration, so that the UE performs DRX parameter configuration as soon as possible to adjust the DRX parameters to a state suitable for the service type of the sparse packet service, and the UE is prevented from being in an active state for a long time. On the contrary, when the terminal type of the UE is not the first terminal type, it is determined that the UE likely uses a non-sparse packet service, so the DRX parameters of the UE are switched after the second DRX parameter switching time with a long duration, so that the DRX parameter configuration operation of the UE is delayed, and the UE is prevented from out-of-synchronization in the real-time data sending and receiving process so as not to affect the data transmission effect. In this embodiment, the base station no longer maintains the uplink synchronization after the determined DRX parameter switching time arrives.

Figure 6:
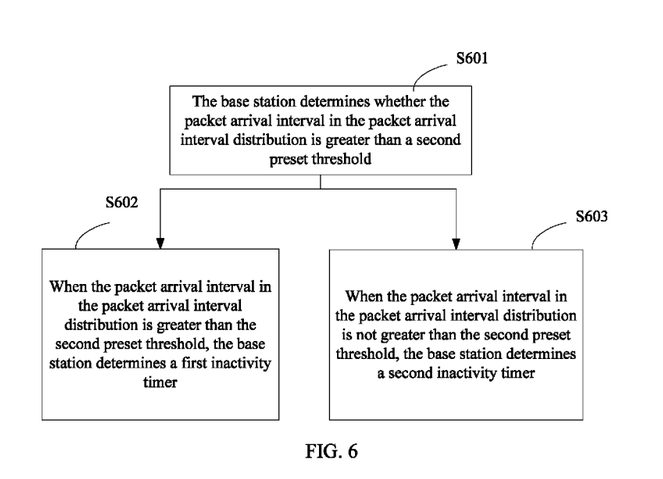
FIG. 6 is a flow chart illustrating implementation of a method for configuring parameters provided by another embodiment of the present invention at a base station side.

Furthermore, as an embodiment of the present invention, in order to reduce signaling consumption in the process of the UE using the sparse packet service, the time for the UE to switch to an idle (Idle) state may be controlled according to the packet arrival interval of the service type of the UE. As shown in FIG. 6, after step S103, the method further includes the following steps.

In step S601, the base station determines whether the packet arrival interval in the packet arrival interval distribution is greater than a second preset threshold.

In step S602, when the packet arrival interval in the packet arrival interval distribution is greater than the second preset threshold, the base station determines a first inactivity timer.

In step S603, when the packet arrival interval in the packet arrival interval distribution is not greater than the second preset threshold, the base station determines a second inactivity timer.

The first inactivity timer and the second inactivity timer are used to control the time for the UE to switch to an idle Idle state.

Like the principle of presetting the first preset threshold of this embodiment, in this embodiment, a second preset threshold is preset at the base station side to distinguish a sparse packet service and a non-sparse packet service. When the packet arrival interval in the obtained packet arrival interval distribution is greater than the second preset threshold, it indicates that the UE is using a sparse packet service, so a long inactivity timer is configured for the UE, so as to prevent the UE from frequently releasing a connection after the inactivity timer expires and reestablishing the connection after a heartbeat appears, thereby effectively reducing signaling overhead; when the packet arrival interval in the obtained packet arrival interval distribution is not greater than the second preset threshold, it indicates that the UE is using a non-sparse packet service, so a short inactivity timer is configured for the UE, so as to satisfy the requirement for real-time data sending and receiving of the UE.

Figure 7:
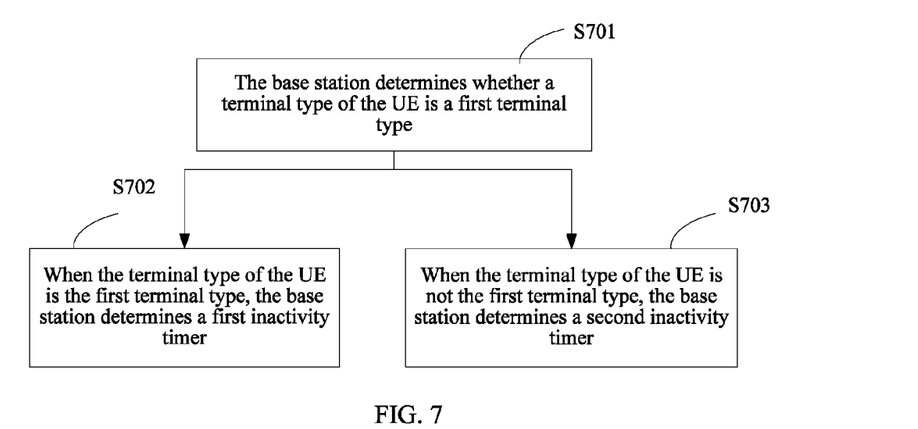
FIG. 7 is a flow chart illustrating implementation of a method for configuring parameters provided by another embodiment of the present invention at a base station side.

As another embodiment of the present invention, in order to reduce signaling consumption in the process of the UE using the sparse packet service, the time for the UE to switch to an Idle state may be controlled according to a terminal type of the UE. As shown in FIG. 7, after step S103, the method further includes the following steps.

In step S701, the base station determines whether a terminal type of the UE is a first terminal type.

Like the principle of determining the terminal type of the embodiment in FIG. 5 of the present invention, the base station may receive a reporting message of the UE, and extract, from the reporting message, content or a special field used to indicate the terminal type of the UE, thereby obtaining the terminal type of the UE; and the base station may also determine the terminal type of the UE according to a default terminal type at the base station side, for example, the base station considers the terminal type of the UE as a smart terminal by default.

In step S702, when the terminal type of the UE is the first terminal type, the base station determines a first inactivity timer.

In step S703, when the terminal type of the UE is not the first terminal type, the base station determines a second inactivity timer.

The first inactivity timer and the second inactivity timer are used to control the time for the UE to switch to an Idle state.

For example, when the terminal type of the UE is a first terminal type (a smart terminal), the base station considers the service type of the UE as a sparse packet service by default, and automatically obtains a long inactivity timer for the UE, so as to prevent the UE from frequently releasing the connection after the inactivity timer expires and reestablishing the connection after the heartbeat appears, thereby effectively reducing signaling overhead; when the terminal type of the UE is not the first terminal type, it indicates that the UE is using a non-sparse packet service, so a short inactivity timer is configured for the UE, so as to satisfy the requirement for real-time data sending and receiving of the UE.

In the embodiments of the present invention, when determining that the service type of the UE is the sparse packet service, the base station configures corresponding DRX parameters for the UE, and determines the corresponding DRX parameter switching time at the same time, so as to decrease the activation time of the UE in the process that the UE uses the sparse packet service, thereby reducing terminal energy consumption of the UE.

It should be noted that, the implementation principles of the embodiments in FIG. 1 to FIG. 7 of the present invention is also applicable to the case in which the base station determines that the service type of the UE is a non-sparse packet service. In this case, the base station may send DRX parameters suitable for a non-sparse packet service to the UE based on the same implementation principle, or instruct the UE to continue to use the set of DRX parameters before switching to the DRX state corresponding to the sparse packet service, so as to implement dynamic configuration of the DRX parameters.

Figure 8:
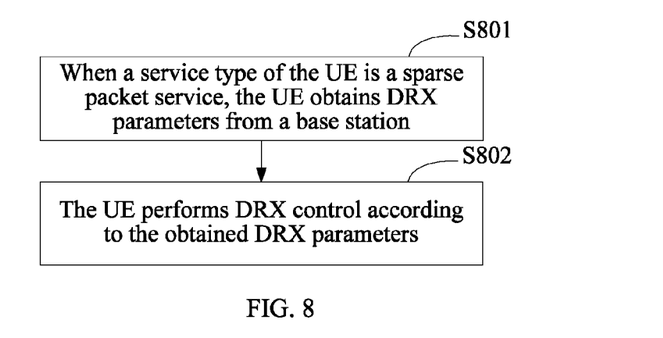
FIG. 8 is a flow chart illustrating implementation of a method for configuring parameters provided by an embodiment of the present invention at a UE side.

FIG. 8 shows an implementation flow of a method for configuring parameters provided by an embodiment of the present invention. In this embodiment, an execution subject of the flow is a UE, and detailed description is as follows.

In step S801, when a service type of the UE is a sparse packet service, the UE obtains DRX parameters from a base station.

In this embodiment, the service type of the UE is determined by the base station, and when determining that the service type of the UE is the sparse packet service, the base station obtains a set of DRX parameters corresponding to the sparse packet service, and sends the DRX parameters to the UE, so the UE obtains the DRX parameters from the base station.

Compared with the DRX parameters in the prior art, the DRX parameters corresponding to the sparse packet service can be used to decrease the activation time of the UE in a DRX state, for example, a longer DRX period may be adopted in the set of DRX parameters. For example, under the constraint of an existing protocol, a long DRX period with a length of 2560 ms satisfying the maximum specification of the protocol may be configured, so as to minimize the activation time of the UE in the DRX state according to the service feature, that is, the long packet arrival interval time, of the data packets of the sparse packet service, thereby saving terminal energy consumption of the UE. The length of the long DRX period is merely an example. Besides, with the evolution of the protocol, the length satisfying the maximum specification of the protocol may also change.

As an embodiment of the present invention, the UE reports the service type to the base station, and the reported service type is used by the base station to determine whether the service type of the UE is the sparse packet service, where the UE may obtain, from an application layer, the service type currently used by the UE, so as to report the service type to the base station.

As another embodiment of the present invention, the UE reports the packet arrival interval distribution of the service type to the base station, and the packet arrival interval distribution is used by the base station to determine whether the service type of the UE is the sparse packet service.

In this embodiment, a packet arrival interval is an arrival time interval of two adjacent data packets sent to the base station by the UE. For different service types, the sending of data packets by the UE may have different periodicities. For example, for the sparse packet service, the sending interval of adjacent data packets may vary from tens of seconds to a few minutes or even tens of minutes, while for other service types than the sparse packet service, for example, a real-time sending and receiving service, the sending interval of adjacent data packets may be a few seconds or even shorter. Therefore, the base station may determine the service type of the UE by obtaining the packet arrival interval distribution of the data packets from the UE.

Specifically, the UE determines the packet arrival interval distribution of the service type of the UE according to a preset list, thereby sending the packet arrival interval distribution to the base station, where the packet arrival interval distribution corresponding to the service type of the UE is preset in the preset list and the preset list is prestored in the UE.

In step S802, the UE performs DRX control according to the obtained DRX parameters.

In this embodiment, the UE performs DRX control according to the obtained DRX parameters, so that when the UE uses the sparse packet service, the activation time of the UE in the DRX state is decreased, thereby effectively reducing terminal energy consumption of the UE.

The implementation principle of this embodiment is consistent with the relevant implementation principles of the embodiments in FIG. 1 to FIG. 7 of the present invention, and therefore details are not repeated herein again.

Figure 9:
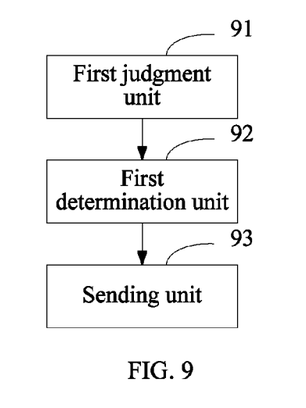
FIG. 9 is a structural block diagram of a base station provided by an embodiment of the present invention.

FIG. 9 is a structural block diagram of a base station provided by an embodiment of the present invention. The structure is used to run the method for configuring parameters shown in FIG. 1 to FIG. 7 of the present invention. For convenience of illustration, only the part related to this embodiment is showed.

Referring to FIG. 9, the base station includes a first judgment unit 91, which determines whether a service type of a user equipment UE is a sparse packet service.

As an embodiment of the present invention, the base station may determine whether a service type is a sparse packet service by obtaining the service type reported by the UE. In this embodiment, the UE may obtain, from an application layer, the service type currently used by the UE, and report the service type to the base station.

In this embodiment, the first judgment unit 91 includes a service type obtaining subunit, which obtains the service type reported from the UE, and a first determination subunit, which determines whether the service type reported by the UE and obtained by the service type obtaining subunit is the sparse packet service.

As another embodiment of the present invention, the base station may determine whether the service type of the UE is the sparse packet service by obtaining the packet arrival interval distribution of data packets from the UE. In this embodiment, a packet arrival interval is an arrival time interval of two adjacent data packets sent to the base station by the UE. For different service types, the sending of data packets by the UE may have different periodicities. For example, for the sparse packet service, the sending interval of adjacent data packets may vary from tens of seconds to a few minutes or even tens of minutes, while for other service types than the sparse packet service, for example, a real-time sending and receiving service, the sending interval of adjacent data packets may be a few seconds or even shorter. Therefore, the base station may determine the service type of the UE by obtaining the packet arrival interval distribution of the data packets from the UE.

In the case of determining whether the service type of the UE is the sparse packet service by obtaining the packet arrival interval distribution of the data packets from the UE:

Optionally, the first judgment unit 91 includes a packet arrival interval distribution subunit, which obtains the packet arrival interval distribution of the data packets from the UE, and a second judgment subunit, which determines whether the service type of the UE is the sparse packet service according to the packet arrival interval distribution obtained by the packet arrival interval distribution subunit.

Optionally, the base station may obtain the packet arrival interval distribution of the data packets from the UE through statistical analysis. At this time, the packet arrival interval distribution subunit includes a packet arrival interval obtaining subunit, which obtains M packet arrival intervals of data packets from the UE within a preset time of period, where M is an integer greater than or equal to 1, and a packet arrival interval generation subunit, which generates the packet arrival interval distribution according to the M packet arrival intervals obtained by the packet arrival interval obtaining subunit.

Optionally, the base station may also obtain the packet arrival interval distribution carried in a reporting message by receiving the reporting message of the UE. In this embodiment, the UE obtains the current service type thereof from the application layer, and obtains the packet arrival interval distribution of the service type in a preset list, where the preset list is prestored at a UE side, and service types that the UE may use and packet arrival interval distribution corresponding to the service types are preset in the preset list. At this time, the packet arrival interval distribution subunit is configured to obtain the packet arrival interval distribution reported by the UE.

The base station further includes a first determination unit 92 and a sending unit 93.

The first determination unit 92 determines DRX parameters of the sparse packet service when a determination result of the first judgment unit 91 is that the service type of the UE is the sparse packet service.

Optionally, the first determination unit 92 is configured to determine the corresponding DRX parameters in N sets of preset DRX parameters according to the packet arrival interval distribution, where N is an integer greater than or equal to 1.

Furthermore, when the base station determines the service type of the UE through the packet arrival interval distribution, the base station may preset N sets of preset DRX parameters, where N is an integer greater than or equal to 1, and each packet arrival interval distribution may correspond to one set of preset DRX parameters. After obtaining the packet arrival interval distribution, by matching the packet arrival interval distribution in the N sets of preset DRX parameters, the base station can determine a set of DRX parameters best matching the current service type of the UE, thereby further improving the accuracy of matching between the DRX parameters and the current service type of the UE, and making configured DRX parameters more compliant with the service feature of the specific service type.

The sending unit 93 sends the DRX parameters determined by the first determination unit 92 to the UE, where the DRX parameters are used by the UE to perform DRX control.

In this embodiment, when determining that the service type of the UE is the sparse packet service, the base station obtains a set of DRX parameters corresponding to the sparse packet service, and sends the set of DRX parameters to the UE, so that the UE performs DRX according to the set of DRX parameters. Compared with the DRX parameters in the prior art, the DRX parameters corresponding to the sparse packet service can be used to decrease the activation time of the UE in a DRX state, for example, a longer DRX period may be adopted in the set of DRX parameters. For example, under the constraint of an existing protocol, a long DRX period with a length of 2560 ms satisfying the maximum specification of the protocol may be configured, so as to minimize the activation time of the UE in the DRX state according to the service feature, that is, the long packet arrival interval time, of the data packets of the sparse packet service, thereby saving terminal energy consumption of the UE. The length of the long DRX period is merely an example. Besides, with the evolution of the protocol, the length satisfying the maximum specification of the protocol may also change.

Figure 10:
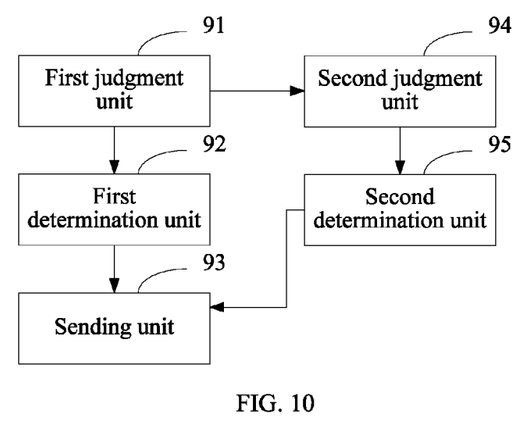
FIG. 10 is a structural block diagram of a base station provided by another embodiment of the present invention.

Optionally, the base station may determine a DRX parameter switching time according to the packet arrival interval distribution of the service type of the UE, so as to control the base station to switch DRX parameters. As shown in FIG. 10, in this embodiment, the base station further includes a second judgment unit 94 and a second determination unit 95.

The second judgment unit 94 determines whether a packet arrival interval in the packet arrival interval distribution obtained by the packet arrival interval distribution subunit is greater than a first preset threshold.

In this embodiment, the first preset threshold may be used to distinguish a sparse packet service and a non-sparse packet service. The packet arrival interval greater than the first preset threshold may be tens of seconds, a few minutes or tens of minutes, and the packet arrival interval less than the first preset threshold may be a few seconds.

The second determination unit 95 determines a first DRX parameter switching time when a determination result of the second judgment unit 94 is that the packet arrival interval in the packet arrival interval distribution is greater than the first preset threshold; determines a second DRX parameter switching time when a determination result of the second judgment unit 94 is that the packet arrival interval in the packet arrival interval distribution is not greater than the first preset threshold, where the first DRX parameter switching time is not equal to the second DRX parameter switching time, and the first DRX parameter switching time and the second DRX parameter switching time are used to control the base station to switch DRX parameters.

For example, when the packet arrival interval in the obtained packet arrival interval distribution is greater than the first preset threshold, it indicates that the sending period of the data packets from the UE is long, so the service type corresponding to the packet arrival interval distribution is a sparse packet service. At this time, the DRX parameters of the UE are switched after the first DRX parameter switching time with a short duration, so that the UE can perform DRX parameter configuration as soon as possible to adjust the DRX parameters to a state suitable for the service type of the sparse packet service, and the UE is prevented from being in an active state for a long time. On the contrary, when the packet arrival interval in the obtained packet arrival interval distribution is not greater than the first preset threshold, it indicates that the sending period of the data packets from the UE is long. At this time, the UE is using a non-sparse packet service, so the DRX parameters of the UE are switched after the second DRX parameter switching time with a long duration, so that the DRX parameter configuration operation of the UE is delayed, and the UE is prevented from out-of-synchronization in a real-time data sending and receiving process so as not to affect data transmission effect.

Figure 11:
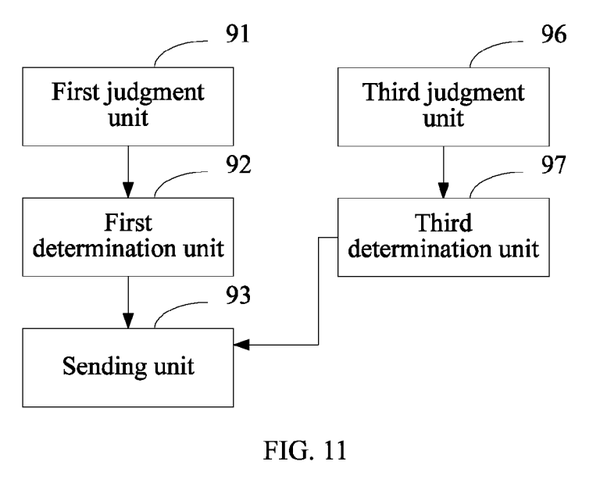
FIG. 11 is a structural block diagram of a base station provided by another embodiment of the present invention.

Optionally, the base station may determine, according to a terminal type of the UE, the time for switching the DRX parameters of the UE. As shown in FIG. 11, in this embodiment, the base station further includes a third judgment unit 96 and a third determination unit 97.

The third judgment unit 96 determines whether the terminal type of the UE is a first terminal type.

The terminal type includes, but is not limited to, a smart terminal and an unsmart terminal. The smart terminal is mostly used to run a non-real-time application. As an example, when the terminal type is the smart terminal, the base station may consider the service type of the UE as a sparse packet service by default. In this embodiment, the base station may receive a reporting message of the UE, and extract, from the reporting message, content or a special field used to indicate the terminal type of the UE, thereby obtaining the terminal type of the UE; and the base station may also determine the terminal type of the UE according to a default terminal type at the base station side, for example, the base station considers the terminal type of the UE as a smart terminal by default.

The third determination unit 97 determines a first DRX parameter switching time when a determination result of the third judgment unit 96 is that the terminal type of the UE is the first terminal type; determines a second DRX parameter switching time when a determination result of the third judgment unit 96 is that the terminal type of the UE is not the first terminal type, where the first DRX parameter switching time is not equal to the second DRX parameter switching time, and the first DRX parameter switching time and the second DRX parameter switching time are used to control the base station to switch DRX parameters.

For example, when the terminal type of the UE is a first terminal type (a smart terminal), it is determined that the UE uses a sparse packet service. At this time, the DRX parameters of the UE are switched after the first DRX parameter switching time with a short duration, so that the UE performs DRX parameter configuration as soon as possible to adjust the DRX parameters to a state suitable for the service type of the sparse packet service, and the UE is prevented from being in an active state for a long time. On the contrary, when the terminal type of the UE is not the first terminal type, it is determined that the UE mostly uses a non-sparse packet service, so the DRX parameters of the UE are switched after the second DRX parameter switching time with a long duration, so that the DRX parameter configuration operation of the UE is delayed, and the UE is prevented from out-of-synchronization in the real-time data sending and receiving process so as not to affect the data transmission effect.

Furthermore, as an embodiment of the present invention, in order to reduce signaling consumption in the process of the UE using the sparse packet service, the time for the UE to switch to an Idle state may be controlled according to the packet arrival interval of the service type of the UE.

Figure 12:
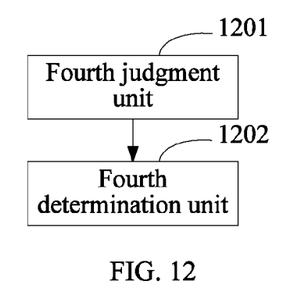
FIG. 12 is a structural block diagram of a base station provided by another embodiment of the present invention.

Optionally, as shown in FIG. 12, the base station further includes a fourth judgment unit 1201, which determines whether a packet arrival interval in the packet arrival interval distribution obtained by the packet arrival interval distribution subunit is greater than a second preset threshold, and a fourth determination unit 1202, which determines a first inactivity timer when a determination result of the fourth judgment unit 1201 is that the packet arrival interval in the packet arrival interval distribution is greater than the second preset threshold; determines a second inactivity timer when a determination result of the fourth judgment unit 1201 is that the packet arrival interval in the packet arrival interval distribution is not greater than the second preset threshold, where the first inactivity timer and the second inactivity timer are used to control the time for the UE to switch to an idle Idle state.

In this embodiment, the second preset threshold is preset at the base station side to distinguish a sparse packet service and a non-sparse packet service. When the packet arrival interval in the obtained packet arrival interval distribution is greater than the second preset threshold, it indicates that the UE is using a sparse packet service, so a long inactivity timer is configured for the UE, so as to prevent the UE from frequently releasing a connection after the inactivity timer expires and reestablishing the connection after a heartbeat appears, thereby effectively reducing signaling overhead; when the packet arrival interval in the obtained packet arrival interval distribution is not greater than the second preset threshold, it indicates that the UE is using a non-sparse packet service, so a short inactivity timer is configured for the UE, so as to satisfy the requirement for real-time data sending and receiving of the UE.

Figure 13:
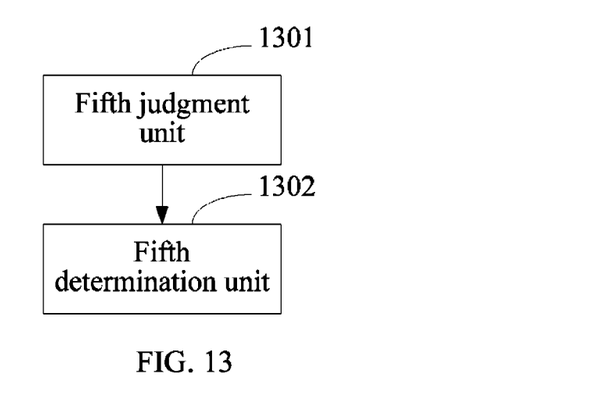
FIG. 13 is a structural block diagram of a base station provided by another embodiment of the present invention.

Optionally, in order to reduce signaling consumption in the process of the UE using the sparse packet service, the time for the UE to switch to an Idle state may be controlled according to a terminal type of the UE. As shown in FIG. 13, the base station further includes a fifth judgment unit 1301, which determines whether the terminal type is a first terminal type, and a fifth determination unit 1302, which determines a first inactivity timer when a determination result of the fifth judgment unit 1301 is that the terminal type of the UE is the first terminal type; determines a second inactivity timer when a determination result of the fifth judgment unit 1301 is that the terminal type of the UE is not the first terminal type, where the first inactivity timer and the second inactivity timer are used to control the time for the UE to switch to an Idle state.

For example, when the terminal type of the UE is a first terminal type (a smart terminal), the base station considers the service type of the UE as a sparse packet service by default, and automatically obtains a long inactivity timer for the UE, so as to prevent the UE from frequently releasing the connection after the inactivity timer expires and reestablishing the connection after the heartbeat appears, thereby effectively reducing signaling overhead; when the terminal type of the UE is not the first terminal type, it indicates that the UE is using a non-sparse packet service, so a short inactivity timer is configured for the UE, so as to satisfy the requirement for real-time data sending and receiving of the UE.

Figure 14:
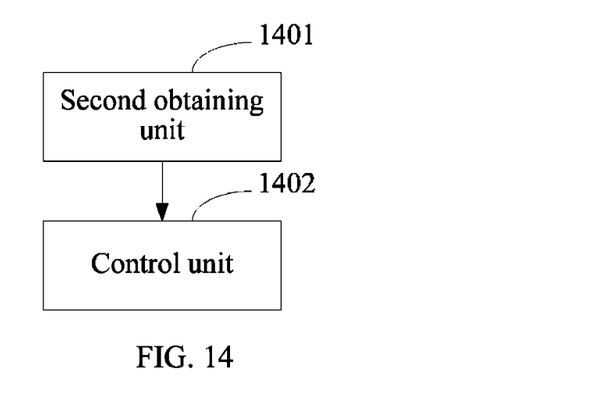
FIG. 14 is a structural block diagram of a UE provided by an embodiment of the present invention.

FIG. 14 is a structural block diagram of a UE provided by an embodiment of the present invention. The structure is used to run the method for configure parameters shown in FIG. 8 of the present invention. For convenience of illustration, only the part related to this embodiment is showed.

Referring to FIG. 14, the UE includes a second obtaining unit 1401 and a control unit 1402.

The second obtaining unit 1401 obtains DRX parameters from a base station when a service type of the UE is a sparse packet service.

In this embodiment, the service type of the UE is determined by the base station, and when determining that the service type of the UE is the sparse packet service, the base station obtains a set of DRX parameters corresponding to the sparse packet service, so the UE obtains the DRX parameters from the base station.

The control unit 1402 performs DRX control according to the DRX parameters obtained by the second obtaining unit 1401.

Compared with the DRX parameters in the prior art, the DRX parameters corresponding to the sparse packet service can be used to decrease the activation time of the UE in a DRX state, for example, a longer DRX period may be adopted in the set of DRX parameters. For example, under the constraint of an existing protocol, a long DRX period with a length of 2560 ms satisfying the maximum specification of the protocol may be configured, so as to minimize the activation time of the UE in the DRX state according to the service feature, that is, the long packet arrival interval time, of the data packets of the sparse packet service, thereby saving terminal energy consumption of the UE. The length of the long DRX period is merely an example. Besides, with the evolution of the protocol, the length satisfying the maximum specification of the protocol may also change.

Optionally, the UE further includes a first reporting unit, which reports the service type of the UE to the base station, where the service type is used by the base station to determine whether the service type of the UE is the sparse packet service.

The UE may obtain, from an application layer, the service type currently used by the UE, so as to report the service type to the base station.

Optionally, the UE further includes a second reporting unit, which reports the packet arrival interval distribution of the service type to the base station, where the packet arrival interval distribution is used by the base station to determine whether the service type of the UE is the sparse packet service.

In this embodiment, a packet arrival interval is an arrival time interval of two adjacent data packets sent to the base station by the UE. For different service types, the sending of data packets by the UE may have different periodicities. For example, for the sparse packet service, the sending interval of adjacent data packets may vary from tens of seconds to a few minutes or even tens of minutes, while for other service types than the sparse packet service, for example, a real-time sending and receiving service, the sending interval of adjacent data packets may be a few seconds or even shorter. Therefore, the base station may determine the service type of the UE by obtaining the packet arrival interval distribution of the data packets from the UE.

Specifically, the UE includes a third obtaining unit, which determines the packet arrival interval distribution of the service type of the UE according to a preset list, where the packet arrival interval distribution corresponding to the service type of the UE is preset in the preset list.

In the embodiment of the present invention, when determining that the service type of the UE is the sparse packet service, the base station configures corresponding DRX parameters for the UE, so as to decrease the activation time of the UE in the process that the UE uses the sparse packet service, thereby reducing terminal energy consumption of the UE.

Persons of ordinary skill in the art should understand that all or a part of the steps of each method embodiment as well as apparatus embodiments may be implemented by a program instructing relevant hardware. The program may be stored in a computer readable storage medium. During the execution of the program, the steps of each method embodiment described above are performed. The storage medium includes: any medium that is capable of storing program codes, such as a ROM, a RAM, a magnetic disk, or an optical disk. The hardware may have specific expression forms such as a memory, a processor and a transceiver.

The above are merely exemplary embodiments of the present invention, and are not intended to limit the present invention. All modifications, equivalent substitutions, and improvements made within the idea and principle of the present invention shall fall within the protection scope of the present invention.

What is claimed is:

1. A method for configuring parameters, the method comprising:
    obtaining, by a user equipment (UE), discontinuous reception (DRX) parameters from a base station, the DRX parameters being obtained when a service type of the UE is a sparse packet service; and
    performing, by the UE, DRX control according to the DRX parameters.

2. The method according to claim 1, wherein, before obtaining the DRX parameters, the method further comprises:
    reporting, by the UE, the service type to the base station, wherein the service type is used by the base station to determine whether the service type of the UE is the sparse packet service.

3. The method according to claim 1, wherein, before obtaining the DRX parameters, the method further comprises:
    reporting, by the UE, packet arrival interval distribution of the service type to the base station, wherein the packet arrival interval distribution is used by the base station to determine whether the service type of the UE is the sparse packet service.

4. The method according to claim 3, wherein, before reporting the packet arrival interval distribution of the service type, the method further comprises:
    determining, by the UE, the packet arrival interval distribution of the service type according to a preset list, wherein the packet arrival interval distribution corresponding to the service type of the UE is preset in the preset list.

5. A user equipment UE, comprising:
    an obtaining unit, configured to obtain discontinuous reception DRX parameters from a base station when a service type of the UE is a sparse packet service; and
    a control unit, configured to perform DRX control according to the DRX parameters obtained by the obtaining unit.

6. The UE according to claim 5, further comprising:
    a first reporting unit, configured to report the service type to the base station, wherein the service type is used by the base station to determine whether the service type of the UE is the sparse packet service.

7. The UE according to claim 5, further comprising:
    a second reporting unit, configured to report packet arrival interval distribution of the service type to the base station, wherein the packet arrival interval distribution is used by the base station to determine whether the service type of the UE is the sparse packet service.

8. The UE according to claim 7, further comprising:
    a third obtaining unit, configured to determine the packet arrival interval distribution of the service type according to a preset list, wherein the packet arrival interval distribution corresponding to the service type of the UE is preset in the preset list.

9. A user equipment UE, comprising:
    a transceiver, configured to obtain discontinuous reception DRX parameters from a base station when a service type of the UE is a sparse packet service; and
    a processor, configured to perform DRX control according to the DRX parameters obtained by the obtaining unit.

10. The UE according to claim 9, wherein the transceiver is further configured to report the service type to the base station and wherein the service type is used by the base station to determine whether the service type of the UE is the sparse packet service.

11. The UE according to claim 9, wherein the transceiver is further configured to report packet arrival interval distribution of the service type to the base station and wherein the packet arrival interval distribution is used by the base station to determine whether the service type of the UE is the sparse packet service.

12. The UE according to claim 11, further comprising:
    a memory, configured to store a preset list; and
    the processor is further configured to determine the packet arrival interval distribution of the service type according to the preset list, wherein the packet arrival interval distribution corresponding to the service type of the UE is preset in the preset list.

* * * * *